(12) United States Patent
Plastina et al.

(10) Patent No.: US 7,831,605 B2
(45) Date of Patent: *Nov. 9, 2010

(54) MEDIA PLAYER SERVICE LIBRARY

(75) Inventors: Daniel Plastina, Sammamish, WA (US); Michael J. Novak, Redmond, WA (US); Jonathan Marshall Cain, Seattle, WA (US); Keith W. Ballinger, North Bend, WA (US); Frank Z. Chang, Bellevue, WA (US); Judson Craig Hally, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 889 days.

This patent is subject to a terminal disclaimer.

(21) Appl. No.: 11/202,556

(22) Filed: Aug. 12, 2005

(65) Prior Publication Data

US 2007/0048712 A1    Mar. 1, 2007

(51) Int. Cl.
G06F 17/30 (2006.01)
(52) U.S. Cl. ...................................... 707/758; 707/812
(58) Field of Classification Search ................. 707/758, 707/812
See application file for complete search history.

(56) References Cited

U.S. PATENT DOCUMENTS

| | | | |
|---|---|---|---|
| 5,355,302 A * | 10/1994 | Martin et al. ................ | 700/234 |
| 5,519,855 A | 5/1996 | Neeman et al. | |
| 5,793,980 A | 8/1998 | Glaser et al. | |
| 6,006,234 A | 12/1999 | Govindarajan et al. | |
| 6,032,130 A | 2/2000 | Alloul et al. | |
| 6,128,652 A * | 10/2000 | Toh et al. .................... | 709/219 |
| 6,243,725 B1 | 6/2001 | Hempleman et al. | |
| 6,343,313 B1 | 1/2002 | Salesky et al. | |
| 6,345,256 B1 | 2/2002 | Milsted et al. | |
| 6,452,609 B1 | 9/2002 | Katinsky et al. | |
| 6,526,411 B1 | 2/2003 | Ward | |
| 6,728,729 B1 | 4/2004 | Jawa et al. | |
| 6,760,721 B1 | 7/2004 | Chasen et al. | |

(Continued)

FOREIGN PATENT DOCUMENTS

GB      2380378 A      2/2003

(Continued)

OTHER PUBLICATIONS

MusicMatch, MusicMatch Jukebox Use's Guide, Feb. 7, 2003, Chapters A1-A6 and 1-9.

(Continued)

*Primary Examiner*—Neveen Abel Jalil
*Assistant Examiner*—Son T Hoang
(74) *Attorney, Agent, or Firm*—Senniger Powers LLP

(57) ABSTRACT

Integrated management of local and remote media files. A playlist of media files adapted for rendering by a media player application are located in either a local media library stored at the computer or a remote media library accessible by the computer via a data communication network or both. Media player operations may be performed on the playlist. A first identifier identifies each of the media files in the playlist and a second identifier represents a source of each of the media files in the playlist. A streaming locator defined by the first and second identifiers locates each of the media files in the playlist in the local media library and then in the remote library.

17 Claims, 11 Drawing Sheets

U.S. PATENT DOCUMENTS

| | | | |
|---|---|---|---|
| 6,933,433 B1 | 8/2005 | Porteus et al. | |
| 6,934,837 B1 | 8/2005 | Jaishima et al. | |
| 6,987,221 B2 | 1/2006 | Platt | |
| 7,093,296 B2 | 8/2006 | Nusser et al. | |
| 7,181,523 B2 | 2/2007 | Sim | |
| 7,227,073 B2 | 6/2007 | Kim | |
| 7,363,278 B2 | 4/2008 | Schmelzer et al. | |
| 7,376,581 B2 | 5/2008 | DeRose et al. | |
| 7,383,229 B2 | 6/2008 | Jacoby | |
| 7,403,564 B2 | 7/2008 | Laksono | |
| 2002/0001395 A1 | 1/2002 | Davis et al. | |
| 2002/0033844 A1 | 3/2002 | Levy et al. | |
| 2002/0069218 A1 | 6/2002 | Sull et al. | |
| 2002/0080170 A1 | 6/2002 | Goldberg et al. | |
| 2002/0099737 A1 | 7/2002 | Porter et al. | |
| 2002/0103920 A1 | 8/2002 | Berkun et al. | |
| 2002/0138619 A1 | 9/2002 | Ramaley et al. | |
| 2002/0143976 A1 | 10/2002 | Barker et al. | |
| 2002/0157095 A1 | 10/2002 | Masumitsu et al. | |
| 2002/0194260 A1* | 12/2002 | Headley et al. | 709/203 |
| 2003/0182100 A1* | 9/2003 | Plastina et al. | 704/1 |
| 2003/0182315 A1 | 9/2003 | Plastina et al. | |
| 2003/0221541 A1 | 12/2003 | Platt | |
| 2003/0227478 A1* | 12/2003 | Chatfield | 345/751 |
| 2004/0006575 A1 | 1/2004 | Visharam et al. | |
| 2004/0017997 A1 | 1/2004 | Cowgill | |
| 2004/0064476 A1 | 4/2004 | Rounds | |
| 2004/0128308 A1 | 7/2004 | Obrador | |
| 2004/0143590 A1 | 7/2004 | Wong et al. | |
| 2004/0143598 A1 | 7/2004 | Drucker et al. | |
| 2004/0172593 A1 | 9/2004 | Wong et al. | |
| 2004/0177319 A1 | 9/2004 | Horn | |
| 2004/0220791 A1 | 11/2004 | Lamkin et al. | |
| 2004/0267693 A1 | 12/2004 | Lowe et al. | |
| 2005/0021478 A1 | 1/2005 | Gautier et al. | |
| 2005/0080783 A1* | 4/2005 | Arrouye et al. | 707/6 |
| 2005/0081159 A1 | 4/2005 | Gupta et al. | |
| 2005/0086501 A1 | 4/2005 | Woo et al. | |
| 2005/0098023 A1 | 5/2005 | Toivonen et al. | |
| 2005/0108430 A1 | 5/2005 | Howarth et al. | |
| 2005/0240494 A1 | 10/2005 | Cue et al. | |
| 2006/0015378 A1 | 1/2006 | Mirrashidi et al. | |
| 2006/0149398 A1 | 7/2006 | Sato et al. | |
| 2006/0242106 A1* | 10/2006 | Bank | 707/1 |

FOREIGN PATENT DOCUMENTS

| | | |
|---|---|---|
| JP | 06-236251 | 8/1994 |
| JP | 11-184481 | 7/1999 |
| JP | 2002-025182 | 1/2002 |
| JP | 2002-108350 | 4/2002 |
| JP | 2003-077214 | 3/2003 |
| JP | 2003-242068 | 8/2003 |
| JP | 2005-502977 | 1/2005 |
| WO | WO 01/28222 A2 | 4/2001 |
| WO | WO 03/023781 A1 | 3/2003 |

OTHER PUBLICATIONS

Edward Swierk, et al., The Roma Personal Metadata Service, Mobile Networks and Applications vol. 7, pp. 407-418, 2002.

Viksnins and Kim, "Musicmatch Jukebox 10.0: CNET editor's review," Jul. 27, 2004, 4 pages, http://reviews.cnet.com/Musicmatch_Jukebox_10_0/4514-8033_7-30567399.html?tag=btm.

Buskirk, Rizzo and Viksnins, "Apple iTunes 4.5: CNET editor's review," Jul. 16, 2004, 3 pages, http://reviews.cnet.com/null/4514-9240_7-30974726.html?tag=btm.

Unknown, "Rhapsody 3.0: CNET editor's review," Apr. 27, 2005, 7 pages, http://reviews.cnet.com/Rhapsody_3_0/4514-3513_7-20050753.html?tag=btm.

Wilkins, "Yahoo Music Unlimited: CNET editor's review," Aug. 8, 2005, 6 pages, http://reviews.cnet.com/Yahoo_Music_Unlimited/4514-9240_7-31383691.html?tag=btm.

Viksnins and Wilkins, "Napster 3.0: CNET editor's review," Mar. 3, 2005, 5 pages, http://reviews.cnet.com/ Napster_3_0/4514-3669_7-31302303.html?tag=btm.

* cited by examiner

| PLAYLIST | | | |
|---|---|---|---|
| MEDIA FILE #1 | SID #1 | SNAME #1 | URL #1 |
| MEDIA FILE #2 | SID #2 | SNAME #2 | URL #2 |
| . . . | . . . | . . . | . . . |
| MEDIA FILE #N | SID #N | SNAME #N | URL #N |

MEDIA PLAYER SERVICE LIBRARY

BACKGROUND

Due to recent advances in technology, computer users are now able to enjoy many features that provide an improved user experience. For example, users can play media and multimedia content on various computing devices, such as personal, laptop, or handheld computers, as well as mobile phones and other portable media devices. In some media environments, a computing device has access to a computer-readable medium storing media files such as Moving Picture Experts Group audio layer-3 (MP3) files and Windows® Media technologies audio (WMA) and video (WMV) files. Many computers today are also able to play compact discs (CDs) and digital versatile discs (DVDs) and have an Internet connection capable of streaming and downloading audio and video.

In the realm of personal digital media, there may be several interesting "scopes" of media. For example, at one end of the spectrum, a user may store a personal media collection locally on one or more machines or devices. A typical user's local or personal media collection includes perhaps a few thousand media items. At the other end of the spectrum, online retailers (e.g., FYE.com), online media sources (e.g., Microsoft Corporation's MSN® Music service), and online subscription services (e.g., Napster® and RealNetwork's Rhapsody® digital music services) often have libraries of more than a million media items available to the user remotely (e.g., via the internet). A general interaction between these two scopes is to extract media from one and insert the items into the other by purchasing and/or downloading media content. But the size of the service library clearly eclipses that of the local library and the rate at which a user consumes media is relatively low when compared to the amount of media released during the same time period. In other words, far more media items are released on any given day than a single user would purchase. As such, the integration of the two scopes has been left undone. Moreover, conventional user interfaces, implementation models, and the like are also very different, which complicates the integration of local and remote media libraries.

SUMMARY

Embodiments of the invention overcome one or more deficiencies in known systems by providing a seamless user experience by which users can manage local and remote media. In this regard, users may consider both local and remote media libraries as part their own collections while retaining a clear understanding of what is local versus what is remote. Aspects of the invention provide user-friendly, content-driven access to complex remote data sources with the benefits of a local user experience. Moreover, aspects of the invention may be applied to various forms of digital media, including songs, movies, television shows, and audio books as well as physical libraries of traditional, non-digital media items such as books, physical DVD collections, and the like.

Computer-readable media having computer-executable instructions for performing methods of managing media collections embody further aspects of the invention. Alternatively, embodiments of the invention may comprise various other methods and apparatuses.

Other features will be in part apparent and in part pointed out hereinafter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3A to FIG. 3F are exemplary screen shot illustrating aspects of a media player user interface according to embodiments of the invention.

FIG. 6 is a block diagram of an exemplary data structure for use in creating intelligent playlists according to an embodiment of the invention.

Corresponding reference characters indicate corresponding parts throughout the drawings.

DETAILED DESCRIPTION

Figure 1:
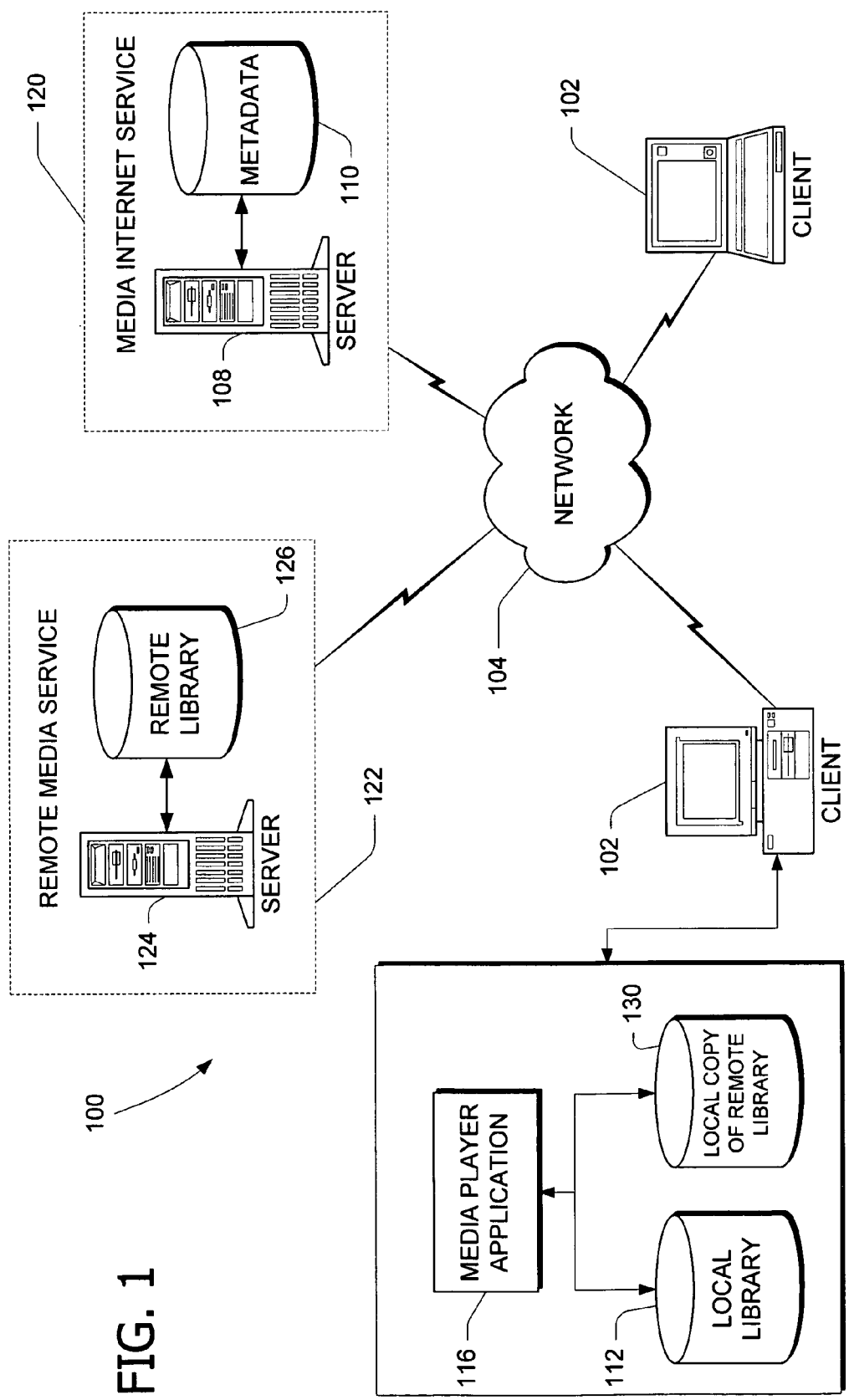
FIG. 1 is a block diagram illustrating components of an exemplary computer system implementing an embodiment of the invention.

Referring now to the drawings, FIG. 1 illustrates an exemplary computing environment in which the present invention may be implemented for enhancing user media playing experience. A media player system 100 includes one or more client computers 102 coupled to a data communication network 104. One or more server computers 108 may also be coupled to the network 104. As shown in FIG. 1, the system 100 also includes one or more databases 110 associated with server 108.

In one embodiment, the computer 102 accesses the server 108 (and the information in the database 110) via network 104. As an example, network 104 is the Internet (or the World Wide Web) but the teachings of the present invention may be applied to any data communication network. Server 108 and computer 102 communicate in the illustrated embodiment using, for example, the hypertext transfer protocol (HTTP).

Aspects of the invention provide software routines that, when executed by a computer, render media content and retrieve, store, and display contextual information. Referring further to FIG. 1, the user's computer 102 accesses one or more digital media files stored in the form of a local media library 112. The local media library 112 may reside on the computer's hard drive, a removable computer-readable storage medium, or the like. In the illustrated embodiment, computer 102 executes a media player application 116 for rendering selected media files. The media player application 116 may be any suitable media player that is configured to play digital media so that a user can experience the content that is embodied on the media. For example, a media player application embodying aspects of the invention may be built on Microsoft Corporation's Windows Media™ Player program.

The media player application 116 may be configured to communicate with server 108 and its associated database 110 via network 104 to access data stored in database 110. In this instance, server 108 and database 110 constitute a media internet services site 120 that enables the user to access, retrieve, and display so-called metadata. In particular, this aspect of the invention enables media player application 116 to access, retrieve, and display metadata in conjunction with rendering media content. Those skilled in the art are familiar with metadata, which is simply information about data. In the context of the present invention, metadata includes information related to specific content of a digital media file being rendered by the media player application 116. Basic metadata includes title, composer, performer, genre, description of content, and the like. Extended metadata includes cover art, performer biographies, reviews, related performers, where to buy similar items, upcoming concerts, ticket sales, URLs to other related experiences including purchase opportunities, and the like.

In the embodiment of FIG. 1, server 108 matches the metadata stored in database 110 to the specific media content that is being experienced by the user. Server 108 then returns the metadata to the user's computer 102. In many of the examples herein, media content is described in the context of music content stored in the client computer's memory for convenience. It is to be appreciated and understood that the media content may be embodied on any suitable media, including digital files downloaded to the local memory of client computer 102 or accessible by computer 102 via network 104. The media content may include, without limitation, specially encoded media content in the form of, for example, an encoded media file such as media content encoded in Microsoft® Windows Media™ format using the Microsoft® Windows Media™ Player program.

The system 100 of FIG. 1 permits the user to render a media file on an enabled media playing device (e.g., computer 102 running Microsoft Windows® operating system and Windows Media™ Player program) and expect not only to experience the media content but also have access to all manner of related metadata. In addition, the user community has the ability to contribute key information such as community ratings to the process to improve the experience for other users.

Aspects of the invention also include communication between the media player application 116 executed on computer 102 with one or more remote media services 122. The remote media service 122 may be, for example, an online retailer (e.g., FYE.com), an online media source (e.g., Microsoft Corporation's MSN® Music service), or an online subscription service (e.g., Napster® and RealNetwork's Rhapsody® digital music services). In one embodiment, remote media service 122 utilizes one or more servers for maintaining a catalog of available media files, that is, a remote library 126. Those skilled in the art are familiar with such services from which a user may download music files and/or listen to songs directly via the Internet, usually for a monthly subscription price or on a per-song basis. For example, the remote library 126 contains the inventory of an online media provider.

The exemplary operating environment illustrated in FIG. 1 includes a general purpose computing device (e.g., computing device 102) such as a computer executing computer-executable instructions. The computing device typically has at least some form of computer readable media. Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. A user may enter commands and information into the computing device through input devices or user interface selection devices such as a keyboard and a pointing device (e.g., a mouse, trackball, pen, or touch pad). Other input devices (not shown) may be connected to the computing device. A monitor or other type of display device (not shown) is also connected to the computing device. In addition to the monitor, computers often include other peripheral output devices (not shown) such as a printer and speakers, which may be connected through an output peripheral interface (not shown).

The computer 102 may operate in a networked environment using logical connections to one or more remote computers. The remote computer may be a personal computer, a server (e.g., servers 108,124), a router, a network PC, a peer device or other common network node, and typically includes many or all of the elements described above relative to computer 102. Such networking environments are commonplace in offices, enterprise-wide computer networks, intranets, and global computer networks (e.g., the Internet).

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

Referring further to FIG. 1, embodiments of the invention provide a relatively seamless user experience by which a user of computer 102 can manage local media (i.e., local library 112) and remotely accessible media (i.e., remote library 126). In one aspect, the user may consider both local and remote media libraries as part of a personal collection while retaining a clear understanding of what is local versus what is remote. Embodiments of the invention provide user-friendly, content-driven access to complex remote data sources such as remote library 126 with the benefits of a local user experience (e.g., responsive behaviors such as searching and sorting; rich user experience constructs such as "word wheeling", searching, sorting, large list scrolling, alternate views, and context menus; and local storage for offline use). Moreover, aspects of the invention may be applied to various forms of digital media, including audio files (e.g., music tracks, news reports, audio web logs, audio books, speeches, comedy routines, etc.), video and multimedia files (e.g., movies, movie trailers, television shows, etc.), and images. In addition, aspects of the invention may also be applied to physical libraries of traditional, non-digital media items such as books, physical DVD collections, and the like.

In one embodiment, media player system 100 implements an integrated media library system. As described above, computer 102 executes media player application 116 for rendering one or more media files. In this instance, local library 112, which may be stored on the hard drive of computer 102 or a removable storage device associated with the computer, contains one or more media files. In addition, remote library 126 contains one or more media files. Although library 126 is remote from computer 102, its media files are accessible by media player application 116 via network 104. A user interface (e.g., see FIGS. 3A-3F) displays information representative of both local library 112 and remote library 126. The media player application 116 is responsive to user input via the user interface for performing one or more media player operations on either local library 112 or remote library 126 or both.

Typical media player operations include, for example: displaying metadata associated with the media files; rendering, copying, or downloading selected media files; rendering samples of selected media files; assigning media files to one or more playlists; searching or sorting the media files according to their metadata or content; displaying media library contents; scrolling through the media library contents; and displaying contextual menus of available media player operations.

One aspect of the invention relates to a local copy 130 of the remote library 126 maintained by computer 102. In one embodiment, the local copy 130 is a compressed database or catalog representative of the remote media files accessible by computer 102 from the remote media service 122. The exemplary schema described in APPENDIX A permits relatively heavy compression of the typically large remote library 126 to permit local storage. For example, compression according to the file structure of this exemplary schema allows 1.2 million tracks of metadata to be fit into about 20 Mbytes of storage. In one embodiment, remote media service 122 generates the copy 130 of remote library 126. In the alternative, media internet service 120 may communicate with remote media service 122 to generate the copy 130 of remote library 126. APPENDIX B provides an exemplary import schema.

Figure 2:
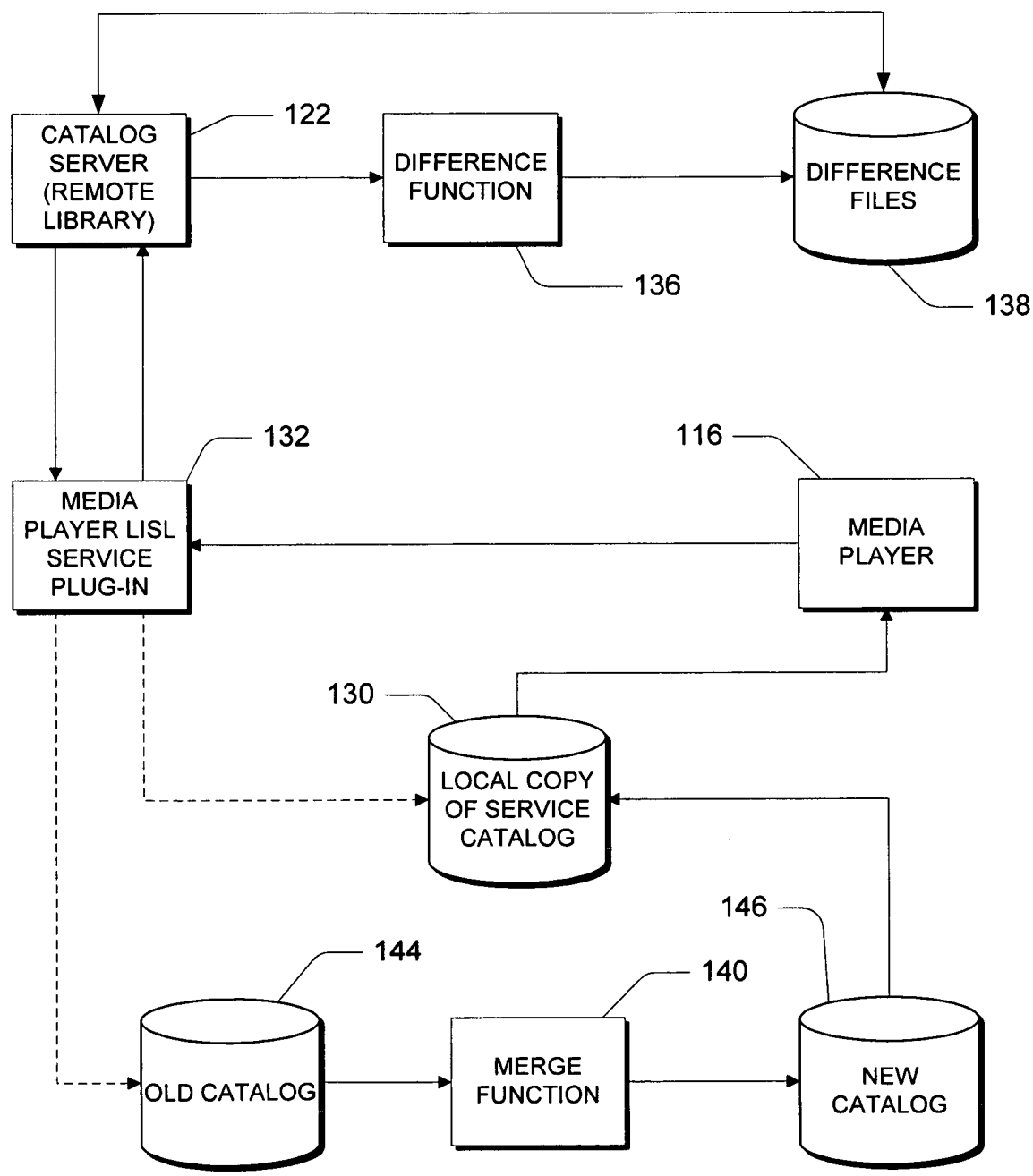
FIG. 2 is an exemplary flow diagram illustrating a catalog update process according to an embodiment of the invention.

FIG. 2 illustrates a catalog update process according to one embodiment of the invention. As shown, media player application 116 begins by requesting a media player "Live in the Service Library" (LISL) plug-in application 132 for the current catalog 126. In turn, the plug-in 132 communicates with the back end, that is, remote media service 122 (or service 120), to obtain either a full catalog or an update. In one embodiment, the catalog server 124 maintains not only remote library 126 in its current state but also a number of previous versions. By taking N previous catalogs and applying a difference function 136, server 124 generates N difference files 138 that describe the differences between each previous catalog and the current one. The remote service 122 (or service 120) then permits the LISL plug-in 132 to download either the full catalog or difference files as appropriate. If plug-in 132 downloads the full catalog (i.e., a compressed database representative of remote library 126), plug-in 132 stores it on computer 102 and returns its location to media player application 116. On the other hand, if plug-in 132 downloads catalog updates, plug-in 132 initiates a client-side update process. In FIG. 2, the LISL plug-in 132 performs a merge function 140 on an old, out-of-date catalog 140 stored on computer 102 to add the difference files 138 and generate a new catalog 146. Following the merge, plug-in 132 updates the local catalog, shown at reference character 130, and returns its location to media player application 116.

Several beneficial aspects of the invention are described below in the context of a series of exemplary user interfaces illustrated in FIG. 3A to FIG. 3F. Generally, the user interfaces depicted in FIGS. 3A-3F are exemplary only and details of their appearance should not be construed as critical. The computer 102 is adapted for performing the media player operations and actions described herein with respect to these user interfaces, which embody aspects of the invention. The media player application 116 executed by computer 102 receives instructions and selections from the user and provided information to the user through the user interfaces.

Figure 3A:
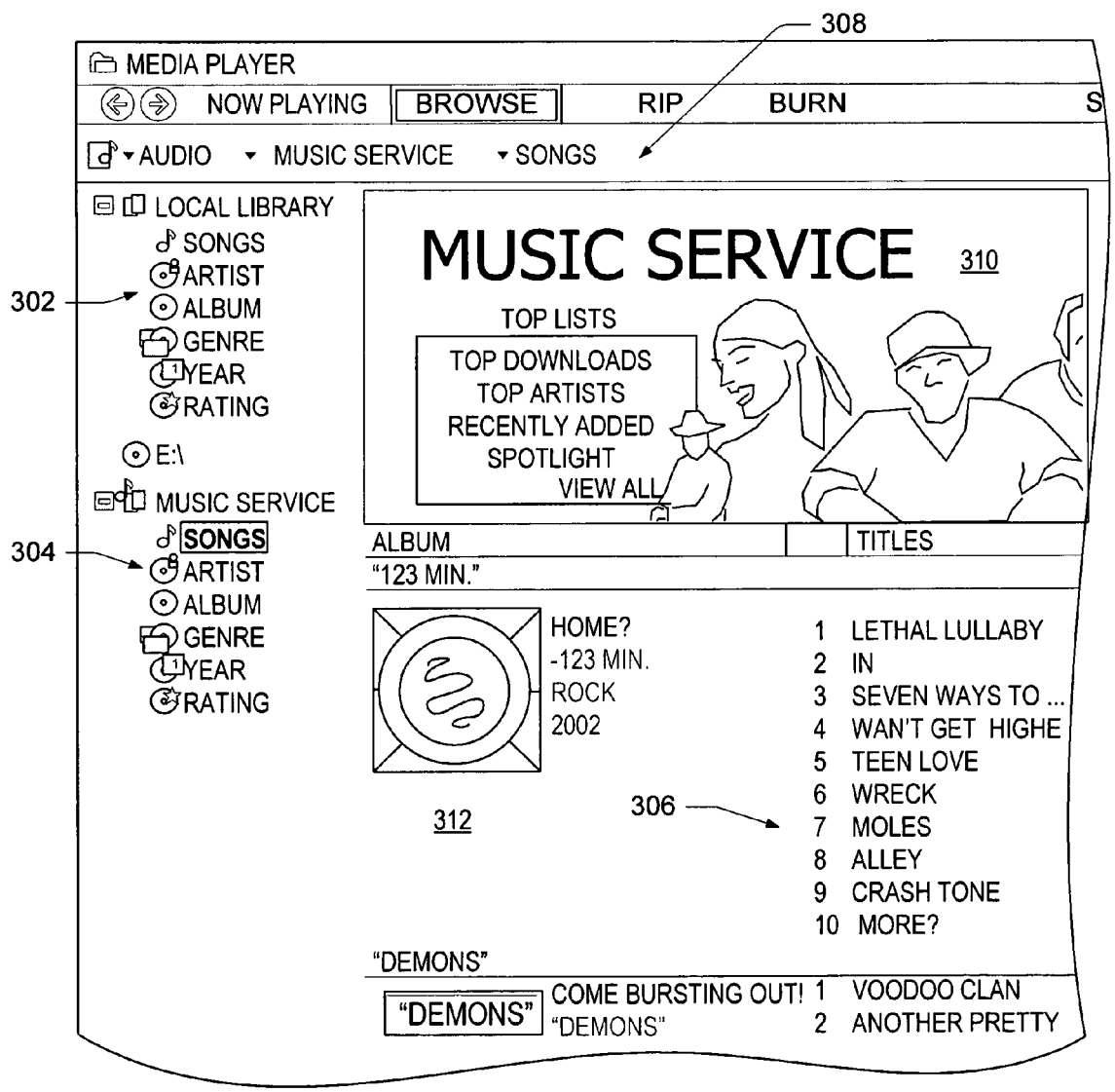

With respect to FIG. 3A, media player application 116 displays at least one hierarchical structure representative of both local library 112 and remote library 126. For example, the hierarchical structure is an expandable and collapsible tree structure 302 that shows the files stored on the hard drive of computer 102 and another expandable and collapsible tree structure 304 showing the remote media files to which the user has access. According to aspects of the invention, the use of a compressed, locally stored database such as local copy 130 permits media player application 116 to very quickly display a listing 306 of thousands or even millions of tracks contained in remote library 126 in an integrated user interface. Instead of or in addition to the tree structures, the user interface also provides a "bread crumb" navigation bar 308 for informing the user about the location and nature of the displayed media item listing 306.

Advantageously, the user interface of FIG. 3A includes a "more info" region 310 displaying metadata, editorially-based recommendations, and the like. These editorially-based recommendations, sometimes referred to as specialty pivots, are "fresh" because they are web sourced and very fast because they are locally referenced. A middle pane 310 of the user interface displays the media item listings 306. In this embodiment, both the bread crumb bar 308 and the tree structure 304 indicate that the media files listed in the middle pane 312 are songs accessible from remote media service 122 via network 104. In addition, middle pane 312 may also display metadata such as album art, track number and name, duration, community or user ratings, artist, etc. The media file listing 306 in the middle pane 312 is consistent in user experience for both the remote media library 126 and the local library 112.

As described in greater detail below, one embodiment of the invention also includes a persistent search field 316 (see FIG. 3B) in the user interface of media player application 116 for receiving a user-entered search term for querying the compressed catalog. An aspect of this embodiment allows "word wheeling," that is, rapidly updating search results as the user enters additional characters of the search term. With respect to "word wheeling," a UI element such as the search field 316 or or other form of query box provides the user with instant search access to information on his or her computer as well as the Internet. In one embodiment, search field 316 uses "word wheeling" to dynamically display results in the middle pane as the user begins typing a search term. For example, as a user types "n-o-r-a-h" into the search 316 (see FIG. 3C), he or she quickly sees a list of any media files that contain the letter "n" and the search results automatically, and quickly, update as the user types additional characters; first "n", then "no", etc.

Figure 3B:
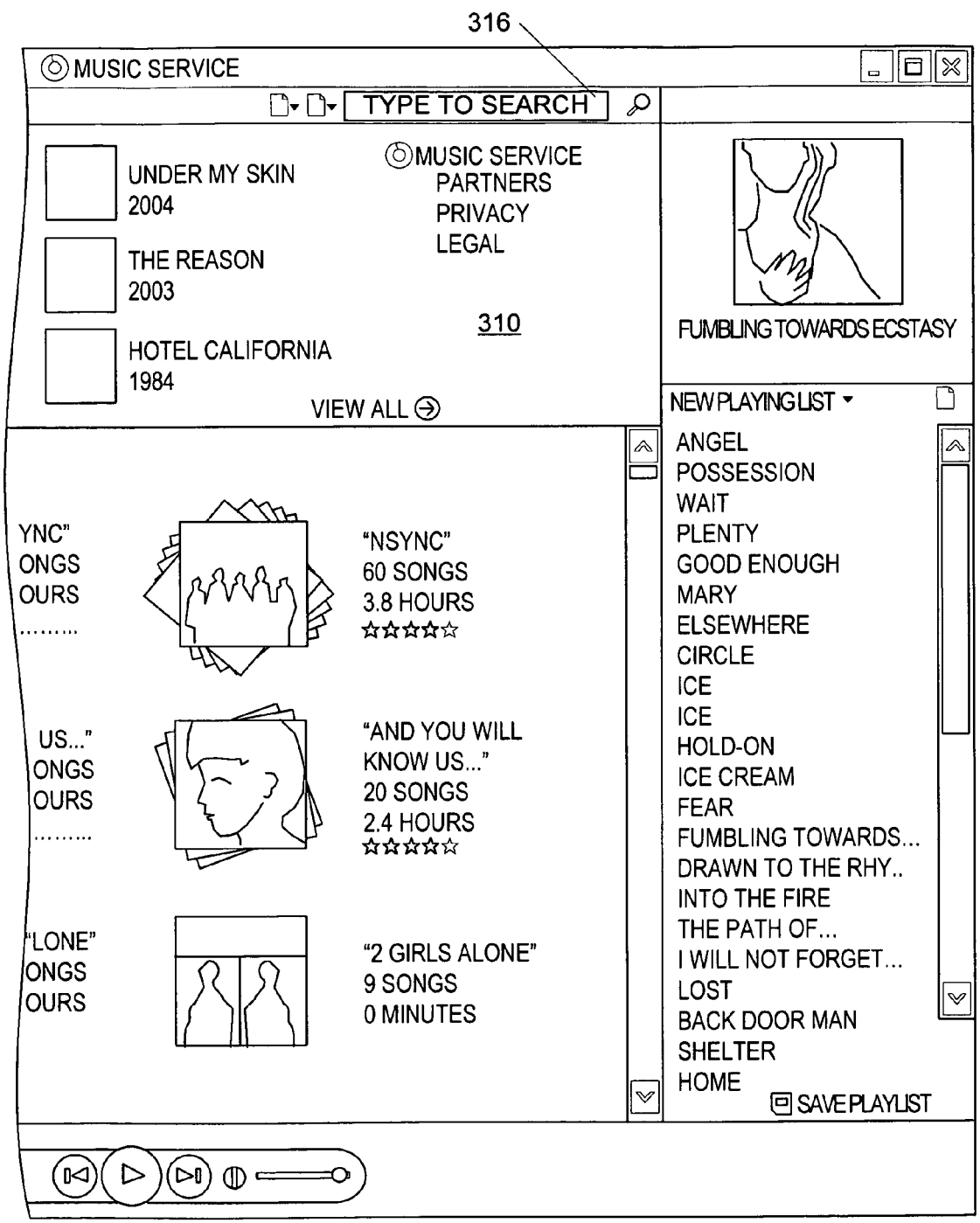

FIG. 3B further illustrates a basket or bin for displaying a playlist 318 of media items. Those skilled in the art are familiar with the use of playlists for ordering media files for rendering by media application 116. Advantageously, media player application 116 is responsive to user input via the user interface for performing various media player operations on one or more of the media files from either local library 112 or remote library 126 or both.

Figure 3C:
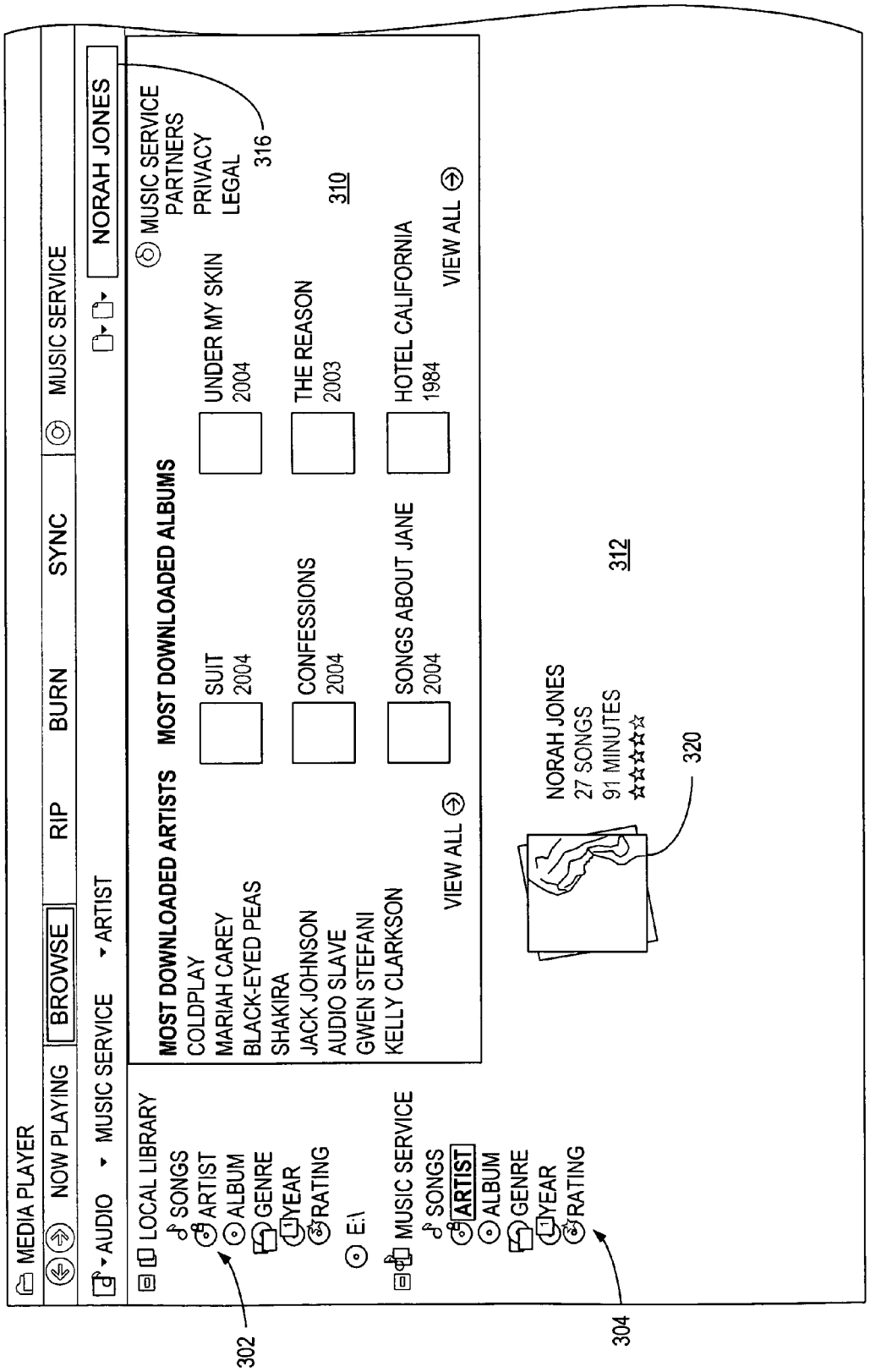
Figure 3D:
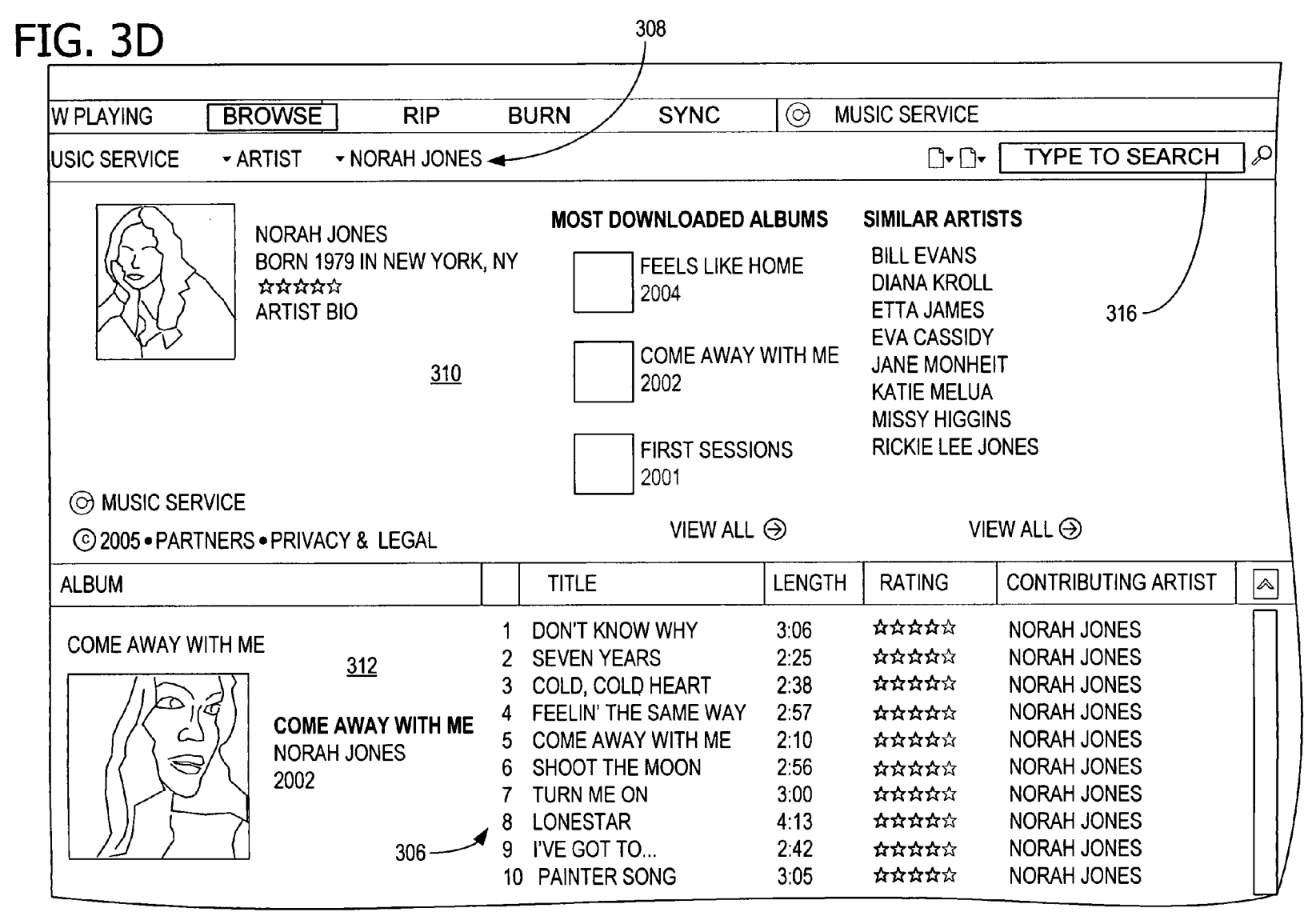
Figure 3E:
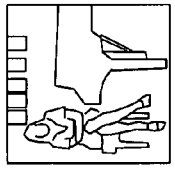
Figure 3F:
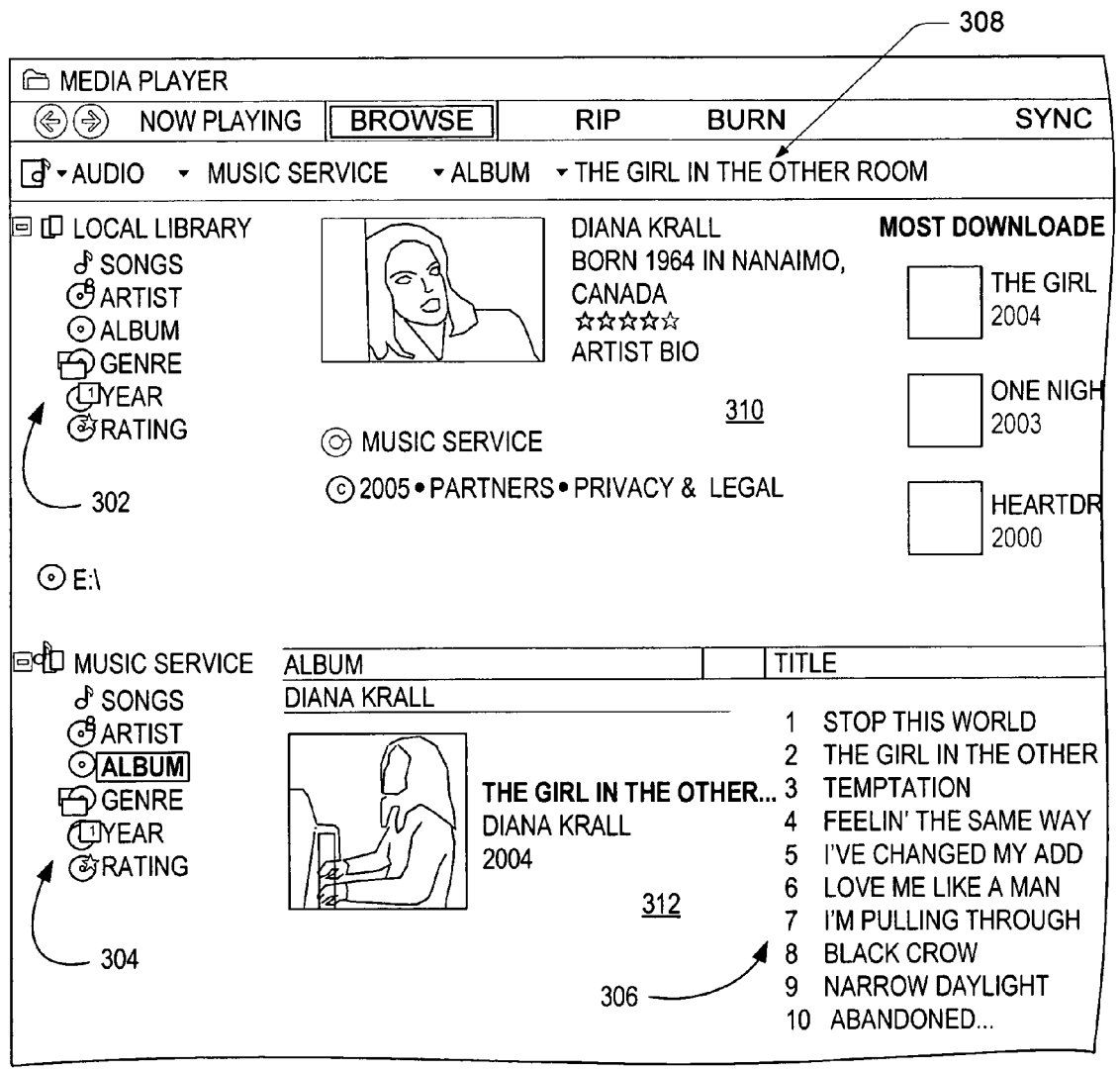

Referring to FIG. 3C, the exemplary user interface indicates by way of, for example, the tree structure 304 and the bread crumb bar 308, remote media files grouped by artist. In one embodiment, stacked album art images 320 (see also FIG. 5) in the middle pane 312 enhance the user experience. In this instance, the "more info" region 310 provides contextual information (e.g., relating to artists) such as the most downloaded artists or featured artists.

In FIG. 3C, the user in this example searched for a particular artist by typing her name into search field 316. In this instance, middle pane 312 displays the album stack 320 to corresponding to the particular artist. Clicking on album stack 320 in FIG. 3C yields a user interface such as the example shown in FIG. 3D. The search field 316 is cleared, indicating that the results are unfiltered. Here, the "more info" region 310 provides artist-specific metadata to the user and drives the local player user interface. The middle pane 312 displays all of the selected artist's albums available from remote library 126. The exemplary user interface of FIG. 3E may be reached by clicking on one of the "similar artists" from the "more info" region 310 of FIG. 3D. The bread crumb navigation bar 308 shows the user's selected similar artist. Clicking on one of the most downloaded albums for this similar artist, as shown in the "more info" region 310 of FIG. 3E, takes the user to exemplary user interface of FIG. 3F. The bread crumb bar 308 now shows the context as "album" because the user selected an album from FIG. 3E.

Figure 4:
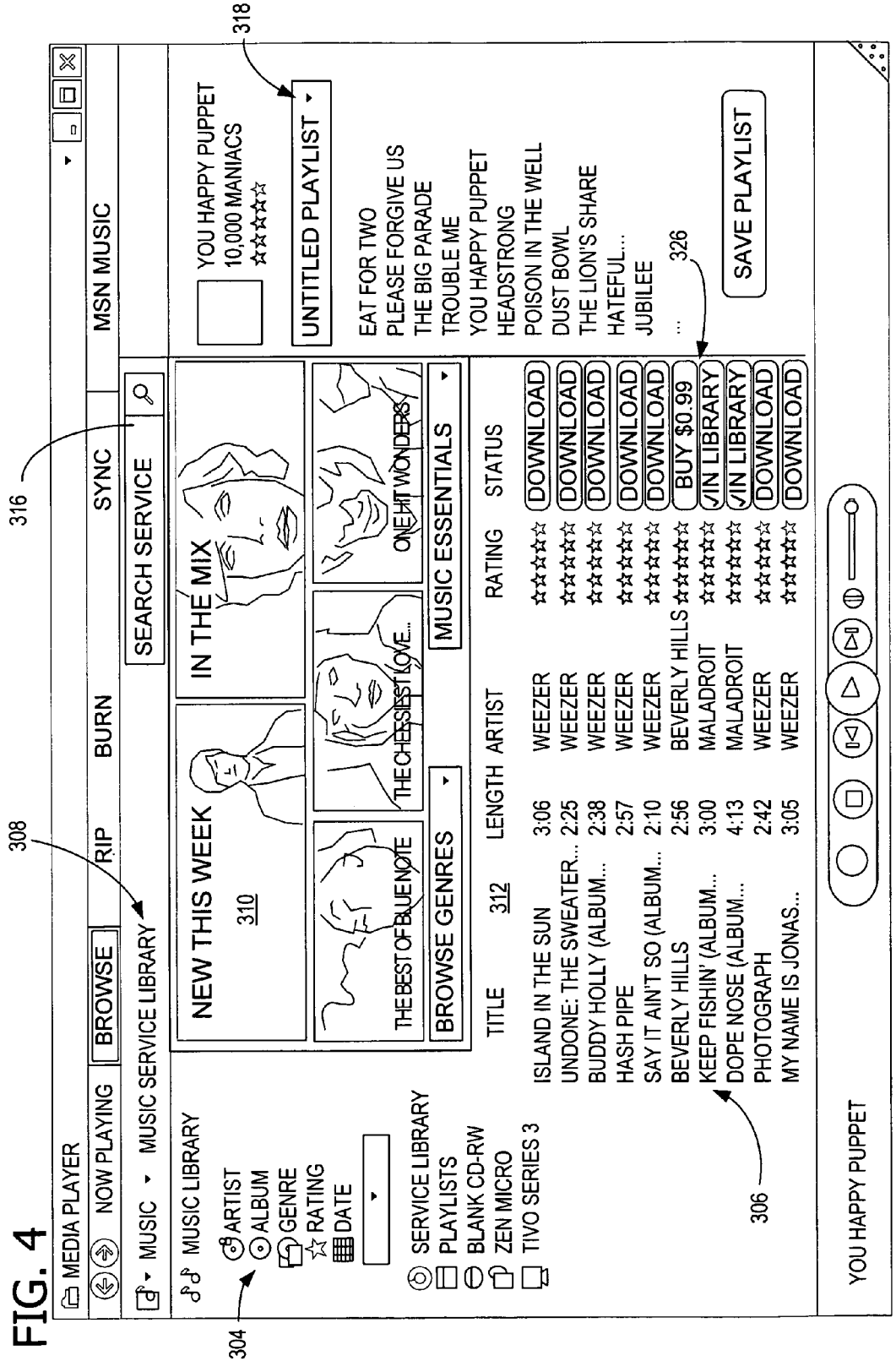
FIG. 4 is an exemplary screen shot illustrating further aspects of a media player user interface according to an embodiment of the invention.

As shown in the exemplary user interface of FIG. 4, graphical representations or icons 326 sometimes referred to as "chicklets" may be used in the service library (i.e., remote library 126) listing 306 local ownership or other status information about the media files. In the illustrated embodiment, an action column in the library view assists the user in behaviors such as Buy, Add to library, Download, Restart download, etc. This is particularly beneficial in integrating the local and remote environments. TABLE I provides a listing of exemplary status information that may be shown in an action column.

TABLE I

| State | Browse | Burn | Sync |
|---|---|---|---|
| Media in catalog only (not local) | Download | Buy $xx.xx | Download |
| Media available locally | ✓ In Library | If burn rights exist, item appears | If sync rights exist, item |

TABLE I-continued

| State | Browse | Burn | Sync |
|---|---|---|---|
| (purchased or downloaded already) | | normally with no icon. If no burn right, users get smart tag allowing them to get more rights. | appears normally with no icon. If no sync right, users get smart tag allowing them to get more rights. |
| Currently being downloaded | Icon shows downloading. | Icon shows downloading. | Icon shows downloading. |
| Failed download | Restart Download Icon | Restart Download Icon | Restart Download Icon |
| Stream only, not purchasable | Item appears normal, no icons. | Entire row for the item is grayed out. | Entire row for the item is grayed out. |
| 30 second clip only (file can't be bought, streamed, or subscribed to) | Item has special "30 second clip only" icon | Entire row for the item is grayed out. | Entire row for the item is grayed out. |
| Purchase only | Buy $xx.xx | Buy $xx.xx | Buy $xx.xx |

Other user interfaces different from those described above are contemplated as within the scope of the claimed invention.

Further aspects of the invention relate to presenting specialty lists in the middle pane, "more info" region, or elsewhere in the media player UI. Instead of only showing tracks and album under an artist view, one embodiment of the invention shows the following exemplary layout. In this instance, each of these is a "container" of media (a list of sorts) and can be opened to view the contents. In other words, a particular artist may be represented in several other lists besides simply "artist" (e.g., albums, charts, Grammy award winners, featured lists, etc.).

An important mechanism to creating intelligent LISL-aware playlists is a novel naming convention employed by embodiments of the invention. For example, a playlist created from service library content has a streaming uniform resource locator (URL), a service identifier (SID), and a service name (SNAME). Playlists created by a user using local content may also be created with a local path as well as with a SID/SNAME when a match for it exists. The playlist file in one embodiment has the path used to author the playlist but the playlist resolver code may use all available IDs to resolve the media to the most suitable content (generally local media is gathered first for rendering even if it is not at the same path followed by remote media).

Yet another aspect of the invention relates to a playlist resolution algorithm for LISL playlists with streaming URLs and SID/SNAME behaviors. For example, when a playlist is created of LISL content, the playlist cannot be persisted until all of the tracks have been downloaded. If the user happens to logout (or close his or her laptop), the user would be in a position where a playlist was not created. This may not be what the user wishes to happen. Rather, the user would like for the playlist to be immediately useable for any purpose (e.g., play, burn, sync, etc.) and for this playlist to favor using media that is local over streaming media. In one embodiment, when a new playlist is created of LISL content, media player application 116 saves the playlist with the streaming URL as well as the SID and SNAME parameters. These three fields may be saved into the playlist. Download of the media in this example happens latently, on its own timeline. Due to errors, slow links, and the like, it may well be that it takes hours or days for the media to appear locally. It may even be possible (due to an excess of retry errors, user aborted downloads, etc.) that the media never downloads to the local computer 102. Upon playback of a playlist, media player application 116 is aware of the SID and SNAME fields according to an embodiment of the invention. Thus, when the SID and SNAME parameters are found, and the path component of the playlist is a web streaming URL (versus a local URL), the media player will first attempt to locate a URL that is local to the computer instead. In this way, local playback is favored over remote playback. Advantageously, the local path may be found by querying the local media player database for records that match the SID and SNAME fields in the playlist. When found, the media player will play the local media file instead of the remote media file.

In one embodiment, the integrated LISL environment permits local filtering of a similar artist list using a local LISL database (i.e., local copy 130) and a local user database (i.e., local library 112). In this regard, aspects of the invention provide highly personalized "Similar Artists" behavior without the need to expose a user's personal play or ownership information to the music service 122. For example, the "more info" region (e.g., region 310 of FIGS. 3A-3F) may show "Similar Artists" to assist the user in music discovery. All by itself, this allows a user to discover music but it does not assist the user in quickly determining which of these similar artists are already represented in the local library 112. One embodiment of the invention breaks this information into different groups, such as "Related Artists (in your library)" and "Artists to Discover (in LISL)". In this instance, the "related artists" view shows artists that the user already has in local library 112 while the "artists to discover" view shows artists not found locally. For example, the LISL catalog represented by local copy 130 may be aware of N artists (for 1 million tracks, this is approximately 90,000 artists). For each artist, the LISL catalog would have N (e.g.: twenty to thirty artists) suggested artists, in order of similarity ranking (the first being the most similar). On the client, there may be two user experience regions for displaying the artist fields. For the "Related Artists" region, the local player code would look to the above N artists and pick those that do exist in the user's local library 112 to display. For the "Artists to Discover" region, the local player code would look to the above N artists and pick those that do not exist in the user's local library 112 to display. The net result of this is that the user can quickly hyperlink to artist they have, and artists they don't have.

Figure 5:
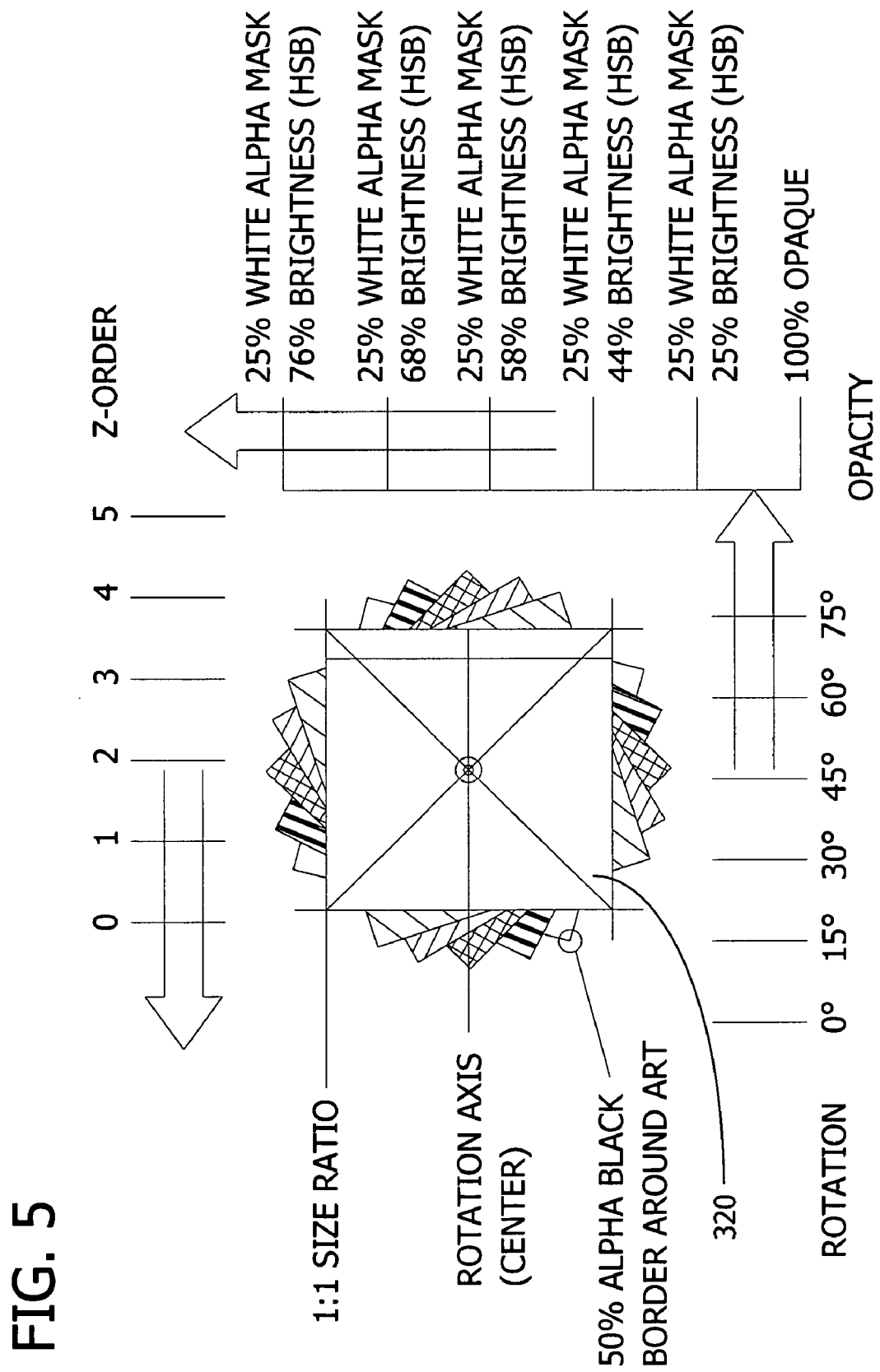
FIG. 5 is a graphical representation of an exemplary album stack according to an embodiment of the invention.

FIG. 5 is a graphical representation of an exemplary album stack (e.g., album stack 320) according to an embodiment of the invention. In one embodiment, the stack 320 provides an album art for each of the albums available for a particular artist. The graphical representations uses accurate album art for each and the album art images are offset from each other to indicate the actual number of albums in the stack. In the illustrated embodiment, the album art images are slightly rotated relative to each other and aspects of the invention alpha blend the images to make them more visually appealing to the user.

Referring to FIG. 6, aspects of the invention relate to a data structure enabling intelligent playlists as described above. The data structure in one embodiment includes a playlist of media files adapted for rendering by media player application 116. In this instance, each of the media files in the playlist is located in either local library 112 or remote library 126. The data structure also includes a pair of identifiers, namely, a first identifier SID for identifying each of the media files in the playlist and a second identifier SNAME representative of a source of each of the media files in the playlist. In addition, the data structure includes a streaming locator, such as a streaming URL, for each of the media files in the playlist. The streaming locator is defined by the first and second identifiers and may be used to first locate each of the playlist media files in local library 112 for rendering before locating each of the playlist media files in remote library 126.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

APPENDIX B

| TRACK | | | |
|---|---|---|---|
| Track_ServiceID | Yes | Integer | n |
| Track_AMGID | No | String | s |
| TrackTitle | Yes | String | s |
| Duration | Yes | Integer (in seconds) | n |
| TrackNumber | Yes | Integer; 0 = undefined | [0 \| n] |
| DiscNumber | Yes | Integer; 0 = undefined | [0 \| n] |
| TrackPrice | Yes | String; '0' = Free; NULL = Unknown | [0 \| $cc.cc] |
| CanBuy | Yes | Boolean | [0\|1] |
| CanStream | Yes | Boolean | [0\|1] |
| CanDownload | Yes | Boolean | [0\|1] |
| HasPreviewClip | Yes | Boolean | [0\|1] |
| ParentalRating | Yes | Normal \| Explicit \| CleanVersion | [N \| E \| C] |

APPENDIX B-continued

| | | | |
|---|---|---|---|
| LinkedTrackArtist_ArtistIDs | Yes | List of Artist_ServiceID | n; n; n; (trailing ;) |
| Composer | Yes | String | "ABBA; Bono; etc" |
| Popularity | Yes | Float | n.nn |
| StarRating | No | Float | n.nn |
| Track_ServiceID | Service provided ID namespace | 32424 | 24 bits |
| Track_AMGID | AMG ID of current item | T----1221 | Null permitted |
| TrackTitle | Track title | She Drives Me Crazy | — |
| Duration | Track duration | 5:21 | — |
| TrackNumber | Track number | 3 | 127 max track number |
| DiscNumber | Disc number (box set) or 0 if not a multi-disc set | 0 | None |
| TrackPrice | Track Price | 0.99 | 29 possible different values in table |
| CanBuy | Track can be purchased | 1 | — |
| CanStream | Track can be streamed | 0 | — |
| CanDownload | Track can be downloaded | 1 | — |
| HasPreviewClip | Track can be previewed (30 s clip) | 1 | — |
| ParentalRating | Parental Advisory Rating | E | — |
| LinkedTrackArtist_ArtistIDs | Track or contributing artists | 51322; 12321; 2444; 55563 | — |
| Composer | Composers for classical content | 424; 52223 | Jazz/Classical composers only |
| Popularity | Position in list when sorted by popularity | 125256 | Ranking; ideally unique |
| StarRating | Optional star rating; show in UX | 4.21 (WMP will round up to 4.25) | Will be rounded as needed |
| ARTIST | | | |
| Artist_ServiceID | Yes | Integer | n |
| Artist_AMGID | No | String | s |
| ArtistName | Yes | String | s |
| LinkedGenreID | Yes | Single GenreID | n |
| LinkedSimilarArtistIDs | Yes | List of Artist_ServiceID | n; n; n; (trailing ;) |
| Popularity | Yes | Float | n.nn |
| StarRating | No | Float | n.nn |
| Artist_ServiceID | Service provided ID namespace | 789789 | 24 bits |
| Artist_AMGID | AMG ID of current item | P----23423 | Null permitted |
| ArtistName | Artist display name | Dido | No inline tab characters; unicode |
| LinkedGenreID | Artist's primary genre | 313 | Main Genre only; not a subgenre |
| LinkedSimilarArtistIDs | Ordered list of similar artists | 31; 32; 5435; 32131; 213123; 123; 3424; 454; 534535; 3223423; 1232; | Max 40 artists; less may be used |
| Popularity | Position in list when sorted by popularity | 432 | Ranking; ideally unique |

APPENDIX B-continued

| | | | |
|---|---|---|---|
| StarRating | Optional star rating; show in UX | 4.5 | Will be rounded as needed |
| ALBUM | | | |
| Album_ServiceID | Yes | Integer | Integer |
| Album_AMGID | No | String | s |
| AlbumName | Yes | String | s |
| AlbumArtist | Yes | Single Artist_ServiceID | IntegerArtistServiceID reference |
| ReleaseDate | Yes | Date | YYYY-MM-DD |
| AlbumPrice | Yes | String; '0' = Free; NULL = Unknown | [0 \| $cc.cc] |
| LinkedGenreID | Yes | Single Genre_ServiceID | — |
| LinkedSubGenreIDs | Yes | List of Subgenre_ServiceIDs | n; n; n; (trailing ;) |
| Popularity | Yes | Float | n.nn |
| StarRating | No | Float | n.nn |
| IsRecentlyAdded | Yes | Boolean | [0\|1] |
| IsFeatured | Yes | Boolean | [0\|1] |
| EditorialGlyph | Yes | integer = gylphID; 0 = no glyph | [0\|1..7] |
| Album_ServiceID | Service provided ID namespace | 789456 | 24 bits |
| Album_AMGID | AMG ID of current item | R----321211 | Null permitted |
| AlbumName | Album Title | Lost on my hard drive | |
| AlbumArtist | Album Artist (or "Various artist", etc) | 34332 | |
| ReleaseDate | Release Date | 2005-0-0 | 0 is a valid day or month |
| AlbumPrice | Album Price | 12.49 | 510 possible different values in table |
| LinkedGenreID | Primary Genre for album | 12 | — |
| LinkedSubGenreIDs | List of associated sub genres | 32; 44; 663 | No limit; we may only pick first N |
| Popularity | Position in list when sorted by popularity | 125256 | Ranking; ideally unique |
| StarRating | Optional star rating; show in UX | 3.25 | Will be rounded as needed |
| IsRecentlyAdded | Flag to add recently added (whatever that means to you) | 1 | — |
| IsFeatured | Flag to indicate this is a featured track (sort bias, etc) | 0 | — |
| EditorialGlyph | Display one of 7 possible decorative images in UX | 3 | 1-7 will have us ask plugin for image |
| LISTS | | | |
| List_ServiceID | Yes | Integer | Integer |
| ListTitle | Yes | String // try for less than 64 | s |
| ListSubtitle | No | String // try for less than 64 -- omit if same! | s |
| ListDescription | No | String // try for less than 256 | s |
| Linked_ItemType | Yes | String | [T \| P \| A \| L \| G \| S] |

APPENDIX B-continued

| | | | |
|---|---|---|---|
| Linked_ListItems | Yes | List of NNNNNN_ServiceID | n; n; n; (trailing ;) |
| Popularity | Yes | Float | n.nn |
| StarRating | No | Float | n.nn |
| IsRecentlyAdded | Yes | Boolean | [0\|1] |
| IsFeatured | Yes | Boolean | [0\|1] |
| EditorialGlyph | Yes | integer = gylphID; 0 = no no glyph | [0\|1..7] |
| List_ServiceID | Service provided ID namespace | | 24 bits |
| ListTitle | List Title | One Hit Wonders | — |
| ListSubtitle | List alternate title | People who once were . . . who are no longer | — |
| ListDescription | List Friendly display text | All your favorite one hit wonders of the 50's, 60's, 70's, 80's, and 90's. | — |
| Linked_ItemType | Tells us what the linked items are | P | Track, Performer, Album, List, Genre, Subgenre |
| Linked_ListItems | | 12; 34; 653; 112 | — |
| Popularity | Position in list when sorted by popularity | 125256 | Ranking; ideally unique |
| StarRating | Optional star rating; show in UX | 3.75 | Will be rounded as needed |
| IsRecentlyAdded | Flag to add recently added (whatever that means to you) | 0 | — |
| IsFeatured | Flag to indicate this is a featured track (sort bias, etc) | 1 | — |
| EditorialGlyph | Display one of 7 possible decorative images in UX | 4 | 1-7 will have us ask plugin for image |
| GENRE | | | |
| Genre_ServiceID | Yes | Integer | n |
| GenreName | Yes | String | s |
| Genre_ServiceID | Service provided ID namespace | 12 | 64 different genres |
| GenreName | Genre display name | Rock | — |
| SUBGENRE | | | |
| SubGenre_ServiceID | Yes | Integer | n |
| SubGenreName | Yes | String | s |
| SubGenreTooltip | No | String // try for less than 64 | s |
| Linked_Genre_ServiceID | Yes | List of Artist_ServiceID | n; n; n; (trailing ;) |
| SortOrderRank | Yes | Integer | n |
| SubGenre_ServiceID | Service provided ID namespace | 22 | 1024 different subgenres |
| SubGenreName | Subgenre display name | Bollywood Brooklyn | — |
| SubGenreTooltip | Describe the meaning of "Bollywood Brooklyn" | We have no idea; let us know if you like it | — |
| Linked_Genre_ServiceID | Parent | 12; 32 | — |
| SortOrderRank | Aids is sorting subgenres in the UX | 2 | Ranking; ideally unique |

What is claimed is:

1. A computerized method of implementing an integrated media library system for managing media files on a computer coupled to a data communication network, said integrated media library system comprising a first media library and a second media library, said computer executing a media player application for rendering one or more of the media files, said method comprising:

defining a playlist of media files, said media files comprising one or more local media files stored at the computer in the first media library and one or more remote media files accessible by the computer in the second media library via the network, wherein each of the media files in the playlist includes a header containing metadata associated with the media file;

identifying each of the media files in the playlist with a first identifier and a second identifier, said first identifier is representative of the media file and said second identifier identifying a service name of the source of the media file;

locating the media files in the playlist in either the first media library or the second media library or both, said first media library containing the local media files and said second media library containing the remote media files, wherein locating the media files comprises defining a path component for each of the media files in the playlist, wherein the path component for each of the media files in the first media library in the playlist comprises a local uniform resource locator (URL) and the path component for each of the media files in the second media library in the playlist comprises a web streaming URL;

saving the first and second identifiers and the path component into the playlist;

extracting the metadata from the header of each media files in the playlist to determine if the media file was previously stored in the first media library;

resolving the playlist based on the saved first and second identifiers and the saved path component to locate the media files in the playlist in the first media library based on the first and second identifiers before locating the media files in the playlist in the second media library based on the path component defined therefor; and preferentially rendering from the first media library each of the media files located in both the first media library and the second media library when the metadata indicates that the media file was previously stored in the first media library.

2. The method of claim 1, wherein the media player operations further include one or more of the following: displaying metadata associated with the media files; rendering samples of the media files; copying the media files; downloading the remote media files to the first media library; searching the media files according to the metadata associated therewith; searching the media files according to content of the media files; sorting the media files according to the metadata associated therewith; and displaying contextual menus of available media player operations.

3. The method of claim 1, wherein defining the path component for each of the media files in the playlist comprises locating, based on the first and second identifiers, each of the local media files in the playlist before locating the remote media files in the playlist.

4. The method of claim 1, wherein locating the media files in the playlist comprises querying the first media library based on the first and second identifiers to define the path component for each of the local media files in the playlist.

5. The method of claim 4, wherein locating the media files in the playlist comprises querying the second media library based on the first and second identifiers to define the path component for each of the remote media files in the playlist.

6. The method of claim 1, further comprising automatically attempting to download the remote media files in the playlist via the network.

7. The method of claim 1, wherein the playlist comprises the path component a service ID, and service name for each of a plurality of selected media files.

8. The method of claim 1, wherein defining the playlist comprises querying metadata associated with the media files in the first media library or the second media library or both based on one or more editorial fields.

9. The method of claim 8, wherein the editorial fields comprise one or more of the following: similar content, similar artists, recommended artists, popularity, featured list, amount of sales, and artist discography.

10. The method of claim 1, further comprising displaying the playlist to a user in a user interface of the media player application.

11. The method of claim 10, further comprising displaying community ratings of one or more of the media files in the playlist to the user in the user interface.

12. The method of claim 1, wherein one or more computer-readable media have computer-executable instructions for performing the method recited in claim 1.

13. At least one computer-readable storage medium having a data structure stored thereon, said data structure comprising:

a playlist of media files adapted for rendering by a media player application executed on a computer in an integrated media library system, each of said media files in the playlist is located in either a local media library stored at the computer or a remote media library accessible by the computer via a data communication network or both, wherein each of the media files in the playlist includes a header containing metadata associated with the media file, said playlist including:

a saved first identifier for identifying each of the media files in the playlist;

a saved second identifier identifying a name of a source of each of the media files in the playlist; and a saved path component for each of the media files in the playlist, wherein the path component for each of the media files in the first media library in the playlist comprises a local uniform resource locator (URL) and the path component for each of the media files in the second media library in the playlist comprises a web streaming URL, wherein the media player application extracts the metadata from the header of each media files in the playlist to determine if the media file was previously stored in the first media library, resolves the playlist based on the saved first and second identifiers and the saved path component to locate the media files in the playlist in the first media library based on the first and second identifiers before locating the media files in the playlist in the second media library based on the path component defined therefor, and preferentially renders from the first media library each of the media files located in both the first media library and the second media library when the metadata indicates that the media file was previously stored in the first media library.

14. The data structure of claim 13, wherein the streaming locator comprises a streaming uniform resource locator (URL).

15. The data structure of claim 13, wherein the media files each include metadata associated therewith and wherein the playlist includes results from querying the metadata in the local media library or the remote media library or both based on one or more editorial fields.

16. The data structure of claim 15, wherein the editorial fields comprise one or more of the following: similar content, similar artists, recommended artists, popularity, featured list, amount of sales, and artist discography.

17. A media player system in an integrated media library system, said media player system comprising:

a client computing device executing a media player application for performing operations on a plurality of media files defined in a playlist, wherein each of the media files in the playlist includes a header containing metadata associated with the media file;

a memory area storing the playlist, said playlist comprising one or more media files stored locally at the client computing device in a first media library and one or more media files stored remotely in a second media library accessible by the client computing device via a data communication network, wherein said playlist further comprises a saved first identifier service ID identifying each the media files in the playlist, a saved second identifier service name identifying a source of each of the media files in the playlist, and a saved path component associated with each of the media files in the playlist, wherein the path component for each of the media files in the first media library in the playlist comprises a local uniform resource locator (URL) and the path component for each of the media files in the second media library in the playlist comprises a web streaming URL; and a user interface implemented by the media player application for displaying the playlist to a user;

wherein said media player operations include one or more of the following: displaying metadata associated with the media files, rendering the media files, rendering samples of the media files, downloading the remote media files to the first media library, searching the media files according to the metadata associated therewith, searching the media files according to the content of the media files, sorting the media files according to the metadata associated therewith, and displaying contextual menus of available media player operations;

wherein said media player extracts the metadata from the header of each media files in the playlist to determine if the media file was previously stored in the first media library, resolves the playlist based on the saved first and second identifiers and the saved path component to locate the media files in the playlist in the first media library based on the first and second identifiers before locating the media files in the playlist in the second media library based on the path component defined therefor, and preferentially renders from the first media library each of the media files located in both the first media library and the second media library when the metadata indicates that the media file was previously stored in the first media library.

* * * * *